United States Patent
Umapathy et al.

(10) Patent No.: US 12,281,987 B2
(45) Date of Patent: Apr. 22, 2025

(54) HOMOGENIZED COHERENT EXCITATION OF A SAMPLE FOR DETERMINING MOLECULAR STRUCTURE

(71) Applicant: INDIAN INSTITUTE OF SCIENCE, Bangalore (IN)

(72) Inventors: Siva Umapathy, Bangalore (IN); Sanchita Sil, Bangalore (IN); Dipak Kumbhar, Bangalore (IN); Srividya Kumar, Bangalore (IN)

(73) Assignee: INDIAN INSTITUTE OF SCIENCE, Bangalore (IN)

( * ) Notice: Subject to any disclaimer, the term of this patent is extended or adjusted under 35 U.S.C. 154(b) by 135 days.

(21) Appl. No.: 18/269,557

(22) PCT Filed: Dec. 22, 2021

(86) PCT No.: PCT/IN2021/051198
§ 371 (c)(1),
(2) Date: Jun. 25, 2023

(87) PCT Pub. No.: WO2022/137261
PCT Pub. Date: Jun. 30, 2022

(65) Prior Publication Data
US 2024/0068947 A1 Feb. 29, 2024

(30) Foreign Application Priority Data
Dec. 24, 2020 (IN) .............................. 202041056361

(51) Int. Cl.
*G01N 21/65* (2006.01)

(52) U.S. Cl.
CPC ... *G01N 21/65* (2013.01); *G01N 2201/06113* (2013.01); *G01N 2201/0631* (2013.01)

(58) Field of Classification Search
CPC ......... G01N 21/65; G01N 2201/06113; G01N 2201/0631
See application file for complete search history.

(56) References Cited

U.S. PATENT DOCUMENTS

2013/0229654 A1* 9/2013 Tatsuta .................... G01J 3/021
359/205.1

FOREIGN PATENT DOCUMENTS

CN 110286117 A * 9/2019

* cited by examiner

*Primary Examiner* — Tarifur R Chowdhury
*Assistant Examiner* — Roberto Fabian, Jr.
(74) *Attorney, Agent, or Firm* — Rivka Friedman

(57) ABSTRACT

The invention provides a method for homogenized coherent excitation of a sample for determining molecular structure. The method includes selecting a monochromatic coherent light, homogenizing the monochromatic coherent light; irradiating the sample with the homogenized monochromatic light; collecting the Raman scattered light to obtain a profile and analyzing the profile to obtain chemical specific signature of the sample. The invention also provides a method for obtaining two dimensional imaging of a sample using irradiation of large sample area by homogenized monochromatic light without compromise in spatial resolution. A system for homogenized coherent excitation of a sample for determining molecular structure is also provided.

14 Claims, 4 Drawing Sheets

HOMOGENIZED COHERENT EXCITATION OF A SAMPLE FOR DETERMINING MOLECULAR STRUCTURE

FIELD OF INVENTION

The invention generally relates to the field of physical chemistry and particularly to a method and a system for homogenized coherent excitation of a sample for determining molecular structure and two-dimensional molecular distribution.

BACKGROUND

Raman spectroscopy is one of the non invasive methods for determination of molecular structure. Raman spectroscopy is a label free technique that is sensitive to chemical composition of a given sample. The technique uses a focused laser source to excite the molecules of the sample and is focused through a microscope. The light backscattered by the sample is collected by the same microscope objective. The in-elastic scattered light is filtered by a notch filter. The filtered light is further dispersed using a dispersive spectrometer. The dispersed in-elastically scattered light is detected using a charged coupled device. Raman images are acquired at high spatial resolutions with the aid of a motorized stage by acquiring spectrum at each point of focus with a defined step size. The motorized stage is moved to bring each successive point on the sample at the focus during mapping experiments. The spectrum at each pixel of image serves as the basis for the construction of Raman images.

One such system for generating spectrographically resolved images is disclosed in U.S. Pat. No. 5,048,959 granted to The Regents of the University of Michigan, hereinafter referred to as '959 Patent. The system incorporates a one dimensional spatial encoding mask which enables an image to be projected onto a two-dimensional image detector after spectral dispersion of the image. The dimension of the image which is lost due to spectral dispersion on the two-dimensional detector is recovered through employing a reverse transform based on presenting a multiplicity of different spatial encoding patterns to the image. The system is especially adapted for detecting Raman scattering of monochromatic light transmitted through or reflected from physical samples. Preferably, spatial encoding is achieved through the use of Hadamard mask which selectively transmits or blocks portions of the image from the sample being evaluated.

One significant disadvantage of the system using a focused light source is that the sampling point is exposed to a very high photon flux. The power output of the photon flux is in the order of $10^5$ W/cm$^2$ or more. The high power of the incident light results in local heating of the sample leading to sample degradation. The irreversible damage of sample may not only lead to loss in sample integrity, but also error in the analysis. Further, the system is specifically adapted for detecting Raman scattering of monochromatic light transmitted through or reflected from physical samples. Hence there is a need for a non-degradable analysis of a sample.

BRIEF DESCRIPTION OF DRAWINGS

So that the manner in which the recited features of the invention can be understood in detail, some of the embodiments are illustrated in the appended drawings. It is to be noted, however, that the appended drawings illustrate only typical embodiments of this invention and are therefore not to be considered limiting of its scope, for the invention may admit to other equally effective embodiments.

SUMMARY OF THE INVENTION

Figure 1:
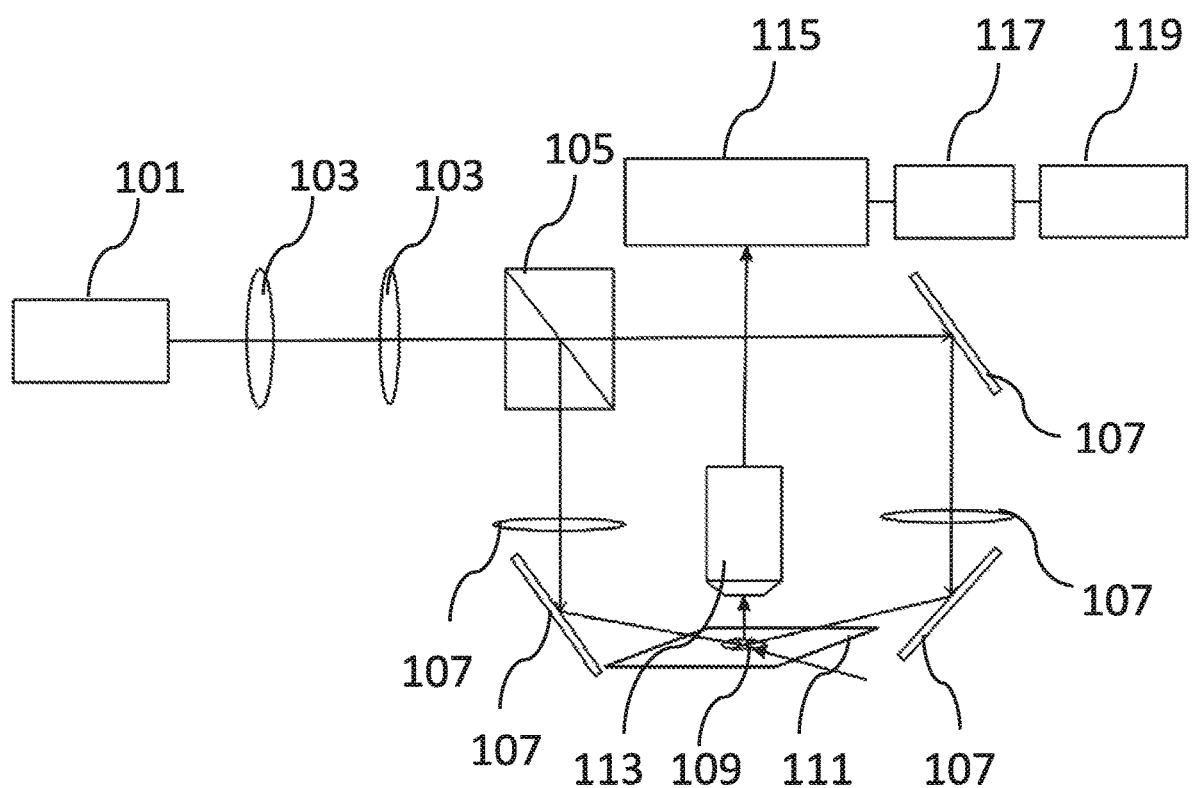
FIG. 1 shows a system for homogenized coherent excitation of a sample for determining molecular structure, according to an embodiment of the invention.

One aspect of the invention provides a method for homogenized coherent excitation of a sample for determining molecular structure. The method includes selecting a monochromatic coherent light; homogenizing the monochromatic coherent light; irradiating the sample with the homogenized monochromatic light; collecting the Raman scattered light to obtain a profile and analyzing the profile to obtain chemical specific signature of the sample.

Another aspect of the invention provides a method for obtaining a two dimensional image of a sample based on molecular distribution. The method includes homogenizing a monochromatic coherent light source; selecting a plurality of position in a plane of axis to irradiate the large sample area with the homogenized monochromatic light; collecting the Raman scattered light to obtain a first profile; altering the collection position along the plane to obtain plurality of profiles; and reconstituting the plurality of profiles to obtain the two dimensional image of the sample.

Another aspect of the invention provides a system for homogenized coherent excitation of a sample for determining molecular structure. The system includes a monochromatic coherent light source, an arrangement for homogenizing the monochromatic coherent light, a sample holder, an objective and an analyser.

DETAILED DESCRIPTION OF THE INVENTION

All the terms mentioned in the description herein shall be interpreted in their usual and standard meaning unless otherwise specified. Various embodiments of the invention provide a method for homogenized coherent excitation of a sample for determining molecular structure. The method for homogenized coherent excitation of a sample for determining molecular structure includes selecting a monochromatic coherent light source; homogenizing the monochromatic coherent light; irradiating the sample with the homogenized monochromatic light; collecting a Raman scattered light to obtain a profile and analyzing the profile to obtain chemical specific signature of the sample. The method described herein above in brief shall be described in detail.

The method works on the principle of using a homogenized light source to illuminate the sample without altering the coherence of the light source. The sample is selected from the group including but not limited to a biological sample, a nanomaterial, pharmaceutical sample, an archeological sample and a food sample. The monochromatic coherent light source is selected from a group comprising of a laser, a diode laser or any other light source with a wavelength from UV-VIS to INFRARED. The wavelength of monochromatic coherent light source is in the range of 300 nm to 1200 nm. In one embodiment of the invention, the wavelength of the monochromatic coherent light source is 785 nm.

Subsequent to selection, the monochromatic coherent light is homogenized. The homogenization of the monochromatic coherent light is achieved by splitting the monochromatic coherent light beam into a plurality of beams. Subsequent to splitting, the split beam is defocused, wherein the defocusing is achieved by an optical element or a non-optical element. Examples of optical elements include but are not limited to a lens, a plurality of lenses, mirrors ad a combination thereof. Examples of non-optical elements include but are not limited to a mesh, followed by collimating the defocused beams to form a homogenized monochromatic coherent light. The homogenized monochromatic coherent light obtained is a low power density monochromatic coherent light. The power density of the monochromatic coherent light as referred herein means the monochromatic coherent light output per unit of a target area. The power density is expressed in watts per square centimeter. The homogenization and delivery of monochromatic coherent light source to the sample is achieved by means including but not limited to plurality of mirrors, lenses, optical cables placed around the sample, different arrangements of excitation optical fibers, optical fiber holders and/or combinations thereof.

In one example of the invention, the power density is calculated by a method as illustrated herein below.

A monochromatic coherent light source of wavelength 785 nm is selected for a coherent excitation. The Raman scattered light is collected by a microscope objective of 50× magnification with numerical aperture 0.75 NA. Hence the laser diameter after the objective is given by the formula herein $$\text{below} = \frac{4\lambda f}{\pi D}.$$

Where,
µ—Wavelength=785 nm
f—Focal length of the Objective
D—Diameter of the laser before the objective
f/D=1/2 NA (NA=Numerical Aperture=0.75)
Input power=496 µW Therefore, the area covered by the laser spot at the focus=$0.346 \times 10^{-8}$ cm$^2$. The power density of the monochromatic coherent light source prior to homogenization is given by=Input Power/Area. Therefore, the power density without the homogenization=$1.433 \times 10^5$ W/cm$^2$.

The shape of the laser beam subsequent to passage through the homogenization arrangement on the sample may be elliptical, circular, spheroid and all such shapes as obvious to a person skilled in the art, depending on the homogenization. In one embodiment of the invention, the illumination area covered by the elliptical shape is about 1 cm$^2$. The laser power is about 134 mW. Therefore, the corresponding power density, due to the homogenized coherent light source, applying the formula mentioned hereinabove is about 0.134 W/cm$^2$. Thus the calculation evidently proves the fact that with homogenized monochromatic coherent light reduces the damage to the sample considerably because of the difference in power densities. That is the light source power density which is not homogenized is in the range of about $10^5$ W/cm$^2$ to about $10^{10}$ W/cm$^2$.

The homogenized monochromatic light with the low power as achieved herein is used for irradiating the sample. The advantage of irradiating the sample with the homogenized monochromatic light includes but is not limited to, coverage of more sample area, increased probability of generation of Raman photons from the sample, low power density on the sample, reduced sample damage and amplification of Raman signal. The sample is irradiated homogenously and Raman photons collected at a step size of lesser than 100 nm at the plane of the sample. Further, a plurality of positions in a plane of axis is selected to irradiate the sample with the homogenized monochromatic light around 360° angle. The Raman scattered light is collected to obtain a molecular profile of the sample. The obtained molecular profile is analyzed and reconstituted to obtain two dimensional spatial information of the sample. The resolution of the profiling is determined by the signal received from at two distinct points at different positions of the sample. Further, each of these points has distinct Raman frequencies Various embodiments of the invention also provide a system for homogenized coherent excitation of a sample for determining molecular structure. The system includes a monochromatic coherent light source, an arrangement for homogenizing the monochromatic coherent light placed proximal to the monochromatic coherent light source, a sample holder, an objective positioned perpendicular to the sample holder and an analyzer operatively coupled to the objective.

FIG. 1 shows a system for homogenized coherent excitation of a sample for determining molecular structure, according to an embodiment of the invention, The system includes a monochromatic coherent light source 101, The monochromatic coherent light source 101 is selected from the group comprising of laser, a diode laser or any other light source with a wavelength from UV-VIS to INFRARED. In one example of the invention, a diode laser is selected as the monochromatic coherent light source. An arrangement for homogenization is positioned coaxial to the monochromatic coherent light source 101. The arrangement for homogenisation includes at least one means for splitting the monochromatic light, at least one means for collimating the split monochromatic light and at least one means for focusing the collimated light. Examples of arrangement for homogenisation include but are not limited to mirror lens arrangement and multiple reflection arrangement. In one embodiment of the invention, the monochromatic coherent light source is initially sent through a plurality of filters 103. An example of filter includes but is not limited to a band pass filter, a neutral density filter, a cut off filter, a notch filter and all such optical systems for reducing the power and/or eliminating non-desirable wavelengths of light. Subsequent to filtering the monochromatic light source, the filtered light is sent through a beam splitter 105. A plurality of lens mirror arrangement 107 is provided to collimate the split beam. A sample holder 109 is placed on a motorized stage 111 for movement of the sample along a plane. An objective 113 is positioned perpendicular to the sample holder 109. The magnification of the microscope objective is in the range of 5× to 150×. In one embodiment of the invention, the magnification of the microscope objective is 100×. In one embodiment of the invention, the numerical aperture of the microscope objective is 0.85. An analyzer is operatively coupled to the objective 113. The analyzer includes a spectrometer 115, a detector 117, and an analysis unit 119. The objective 113 collects the Raman scattered light and delivers to a spectrometer 115. A detector 117 is coupled to the spectrometer 115. The output of the detector 117 is sent to an analysis unit 119 for obtaining two dimensional spatial molecular information of the sample.

EXAMPLE 1

Figure 2:
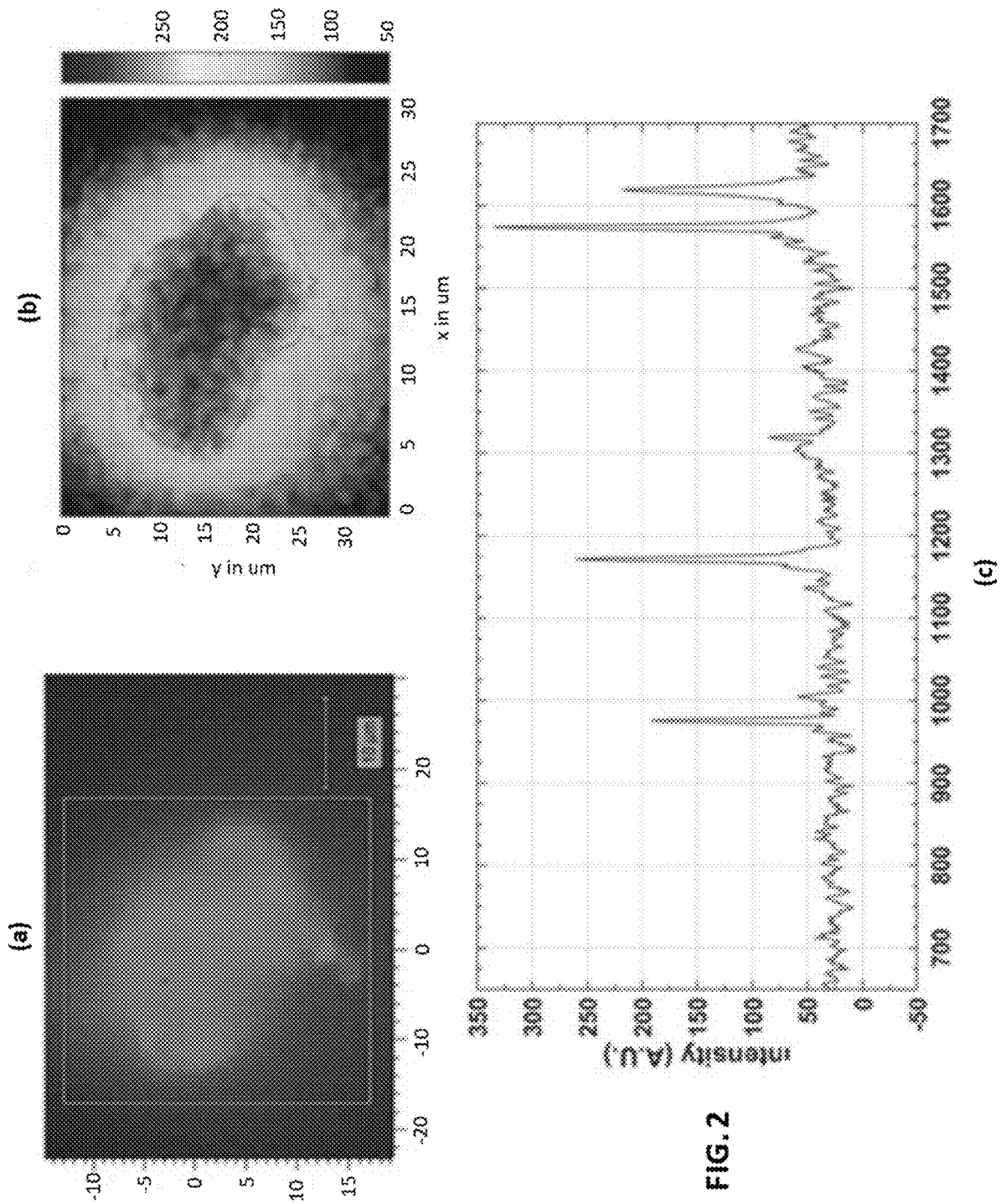
FIG. 2a shows a white light image of a trans-stilbene powder, according to an example of the invention.
FIG. 2b shows a 2D Raman intensity map of a trans-stilbene powder, according to an example of the invention.
FIG. 2c shows a Raman spectrum of a trans-stilbene powder, according to an example of the invention.

In one example of the invention, the method and the system, as described hereinabove, is applied for detection of trans-stilbene. The trans-stilbene can be chosen to be in the crystalline form or the powder form. FIG. 2a shows a white light image of trans-stilbene powder. The trans-stilbene powder is irradiated with a homogenized diode laser of 785 nm for a coherent excitation. The trans-stilbene powder is scanned with step size of 500 nm in a selected rectangle in a raster pattern to record a Raman spectrum at each stage. The Raman scattered light obtained by the coherent excitation of the trans-stilbene powder is collected by a microscope objective of 100× magnification with numerical aperture 0.85. FIG. 2c shows a Raman spectrum of trans-stilbene powder. Dominant peaks were observed at 976 $cm^{-1}$, 1172 $cm^1$ and 1574 $cm^{-1}$. The Broad peak is observed at wave number 1172 $cm^1$. The specific peak intensity, area under the peak or the ratio between peaks obtained is used for obtaining a two dimensional image. FIG. 2b shows a 2D image map of trans-stilbene powder using specific. Peak intensity. The original outline of the crystal from white light image coincides with obtained Raman image. The Raman image obtained confirms the shape of trans-stilbene powder. Further, the 2D image map is imported to MATLAB software for information extraction from the Raman Spectrum. Processing of the Raman spectrum consists of steps including but are not limited to removing random noise, removing spikes due to cosmic ray and smoothing.

EXAMPLE 2

Figure 3:
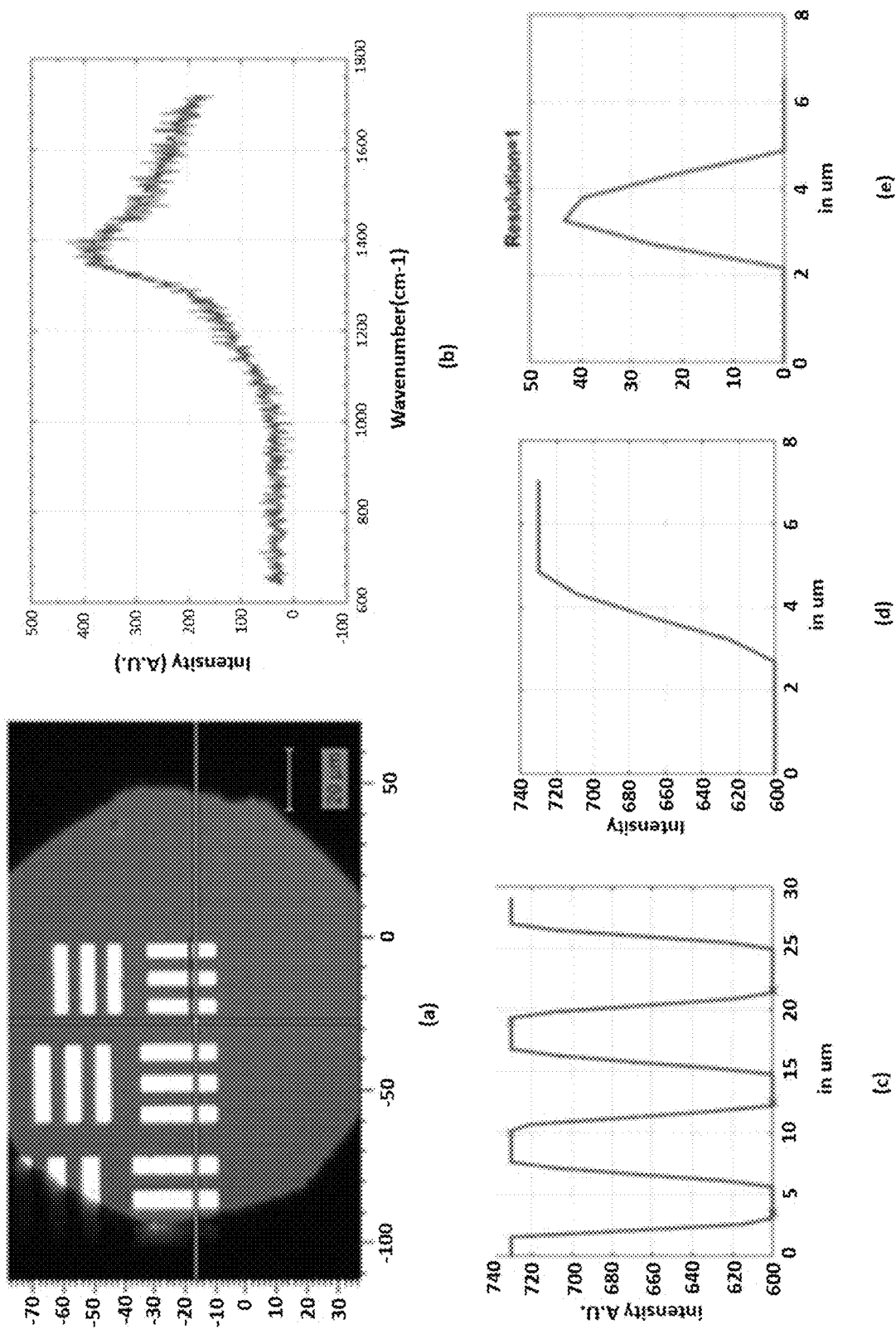
FIG. 3a shows a white light image of a USAF 1951 resolution target of strip size 5.0 μm, according to another example of the invention.
FIG. 3b shows a Raman spectrum of the USAF 1951 resolution target, according to an example of the invention.
FIG. 3c shows an intensity profile of the USAF 1951 resolution target, obtained by line scan, according to another example of the invention.
FIG. 3d shows an intensity profile of the USAF 1951 resolution target, obtained along the edge scan, according to another example of the invention.
FIG. 3e shows a resolution of two consecutive lines of the USAF 1951 resolution target, according to another example of the invention.

In another example of the invention, Resolution test targets are used to measure the accuracy or performance of an imaging system. In one preferred example of the invention, a united states air force (USAF) 1951 resolution target is chose to evaluate spatial resolution. FIG. 3a shows a white light image of a USAF 1951 resolution target. The USAF 1951 pattern consists of regularly spaced three strips vertically and horizontally. The size of each strip is 5 micrometer. The distance between two strips is also equivalent to 5 micrometer. The strip is made up of thin layer of silver and the substrate is silica glass. The USAF 1951 resolution target is irradiated with a homogenized diode laser of 785 nm wavelength for coherent excitation and preceded by collection of Raman scattered light to obtain a profile. The USAF 1951 resolution target is scanned along line with step size of 500 nm to record Raman Spectrum at each stage. FIG. 3b shows a Raman spectrum of the USAF 1951 resolution target. Broad peak is observed at 1372 $cm^{-1}$ wave number. FIG. 3c shows an Intensity profile of the USAF 1951 resolution target along line scan. The intensity profile of the USAF 1951 resolution target reveals that the individual strips has low intensity of Raman peak whereas the space between strips has increased intensity of 1372 $cm^1$.

FIG. 3d shows an intensity profile of the USAF 1951 resolution target, along edge. An edge of the sample is selected; the intensity profile is extracted to determine edge resolution. Differentiation of the line profile gives a point spread function. The full width half maximum of the point spread function determines resolution. The condition applied is resolution is inversely proportional to full width at half maximum. FIG. 3e shows resolution of the USAF 1951 resolution target, the resolution obtained is 1 micrometer.

Figure 4:
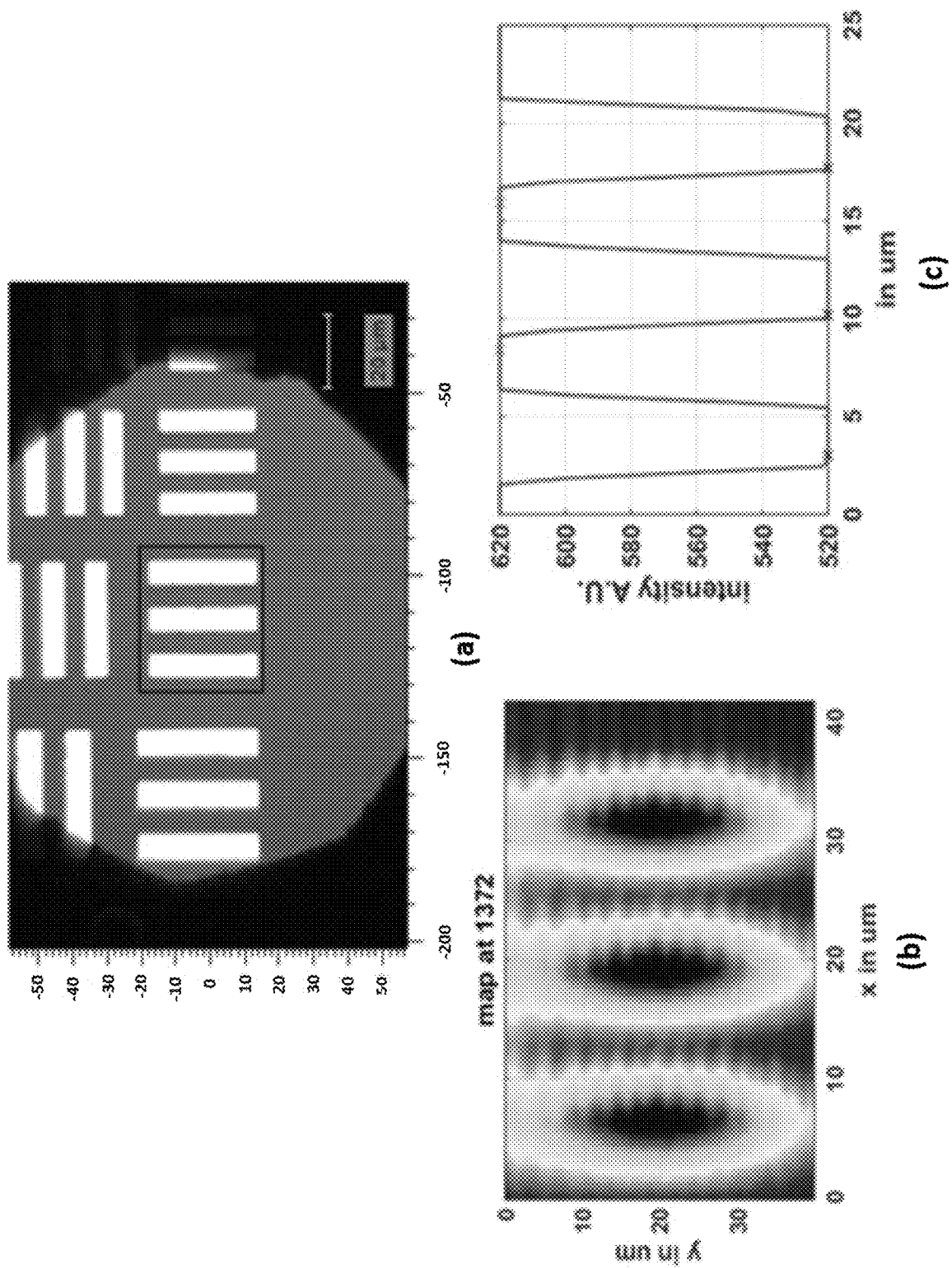
FIG. 4a shows a white light image of the USAF 1951 resolution target of strip size 6.6 μm, according to an alternate example of the invention.
FIG. 4b shows a 2D Raman intensity map of the USAF 1951 resolution target, according to an alternate example of the invention.
FIG. 4c shows an Intensity profile along X axis of the USAF 1951 resolution target, according to an alternate example of the invention.

In an alternate example of the Invention, similar resolution determination experiment as above is conducted for the USAF 1951 resolution target of strip size 6.6 µm. The distance between two strips is also 6.6 µm. FIG. 4a shows a white light image of the USAF 1951 resolution target. FIG. 4b shows a 2D Raman intensity map at Raman Peak 1372 $cm^{-1}$ and FIG. 4c shows an Intensity profile of the USAF 1951 resolution target, obtained by line scan and resolution obtained in the experiment is 600 nm at the edge.

The invention provides a method for selecting a monochromatic coherent light; homogenizing the monochromatic coherent light; irradiating the sample with the homogenized monochromatic light; collecting the Raman scattered light to obtain a profile and analyzing the profile to obtain chemical specific signature of the sample. One significant advantage of the method is that the lower power density of the homogenized coherent source does not damage the constitution of the sample, thereby allowing re-use of the sample for further analysis. The method also provides a two dimensional image of the sample without compromise in spatial resolution, thereby allowing simultaneous detection of plurality of constituents of the sample.

The foregoing description of the invention has been given merely to illustrate the invention and is not intended to be limiting. Since modifications of the disclosed embodiments incorporating the spirit and substance of the invention may occur to a person skilled in the art, the invention should be construed to include everything within the scope of the appended claims and equivalents thereof.

We claim:

1. A method for homogenized coherent excitation of a sample for determining molecular structure, the method comprising: homogenizing a monochromatic coherent light source; wherein the homogenization is achieved by splitting the monochromatic coherent light beam into a plurality of beams using a beam splitter;
    defocusing the split beam; collimating the defocused beams using lens mirror arrangements to form a homogenized monochromatic coherent light;
    simultaneously irradiating the sample at a plurality of points with the homogenized monochromatic light; obtaining a Raman profile specific to each of the simultaneously irradiated plurality of points on the sample; and
    analysing each of the Raman profile to obtain a collective signature specific to the sample.

2. The method as claimed in claim 1, wherein the wavelength of the monochromatic light source is in the range of 300 nm to 1200 nm.

3. The method as claimed in claim 1, wherein the homogenized monochromatic coherent light is a low power density monochromatic coherent light.

4. The method as claimed in claim 1, wherein the low power is in the range of about 10 W/cm² to about 2 W/cm².

5. The method as claimed in claim 1, wherein the irradiation angle is independent of the location of the sample.

6. The method as claimed in claim 1, wherein the collection angle is independent of the angle of irradiation and/or location of the sample.

7. The method as claimed in claim 1, wherein the sample is selected from a group comprising of a biological sample, an archaeological sample, a food sample, a pharmaceutical sample, a nanomaterial sample.

8. A method for obtaining a two-dimensional image of a sample, the method comprising: homogenizing a monochromatic coherent light source using lens mirror arrangements;
  selecting a plurality of position in a plane of axis to simultaneously irradiate the sample with the homogenized monochromatic light around 360° angle; collecting the Raman scattered light to obtain a first profile;
  altering the position along the plane to obtain at least one second profile; and
  reconstituting the plurality of profiles to obtain the two-dimensional image of the sample without compromising spatial resolution.

9. The method as claimed in claim 8, wherein the wavelength of the monochromatic light source is in the range of 300 nm to 1200 nm.

10. The method as claimed in claim 8, wherein the homogenization of the monochromatic coherent light is achieved by:
  splitting the monochromatic coherent light beam into a plurality of beams;
  defocusing the split beam, wherein the defocusing is achieved by an optical element or a non-optical element; and
  collimating the plurality of beams to form a homogenized monochromatic coherent light.

11. The method as claimed in claim 8, wherein the homogenized monochromatic coherent light is a low power density monochromatic coherent light.

12. The method as claimed in claim 11, wherein the low power is in the range of about $10^{-5}$ W/cm² to about 2 W/cm².

13. The method as claimed in claim 8, wherein the collection angle is independent of the angle of irradiation.

14. The method as claimed in claim 8, wherein the sample is a biological sample, an archaeological sample, food sample, pharmaceutical sample, a nanomaterial sample.

* * * * *